(12) United States Patent
Fan et al.

(10) Patent No.: US 11,362,770 B2
(45) Date of Patent: Jun. 14, 2022

(54) TRIGGER RETRANSMISSION OF A FEEDBACK IN UNLICENSED SPECTRUM

(71) Applicant: QUALCOMM Incorporated, San Diego, CA (US)

(72) Inventors: Zhifei Fan, San Diego, CA (US); Tao Luo, San Diego, CA (US); Xiaoxia Zhang, San Diego, CA (US); Arumugam Chendamarai Kannan, San Diego, CA (US); Jing Sun, San Diego, CA (US); Makesh Pravin John Wilson, San Diego, CA (US); Yan Zhou, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 16/737,258

(22) Filed: Jan. 8, 2020

(65) Prior Publication Data

US 2020/0228258 A1 Jul. 16, 2020

Related U.S. Application Data

(60) Provisional application No. 62/792,718, filed on Jan. 15, 2019.

(51) Int. Cl.
*H04L 1/18* (2006.01)
*H04L 5/00* (2006.01)
(Continued)

(52) U.S. Cl.
CPC .......... *H04L 1/1854* (2013.01); *H04L 1/1861* (2013.01); *H04L 5/0055* (2013.01);
(Continued)

(58) Field of Classification Search
CPC ... H04L 1/1854; H04L 1/1861; H04L 5/0055; H04L 5/001; H04W 72/0413; H04W 72/042; H04W 72/14; H04W 74/0808
See application file for complete search history.

(56) References Cited

U.S. PATENT DOCUMENTS 10,912,123 B2 * 2/2021 Li ..................... H04W 74/0833
2016/0302076 A1 * 10/2016 Chou .................... H04W 16/14
(Continued)

FOREIGN PATENT DOCUMENTS

CN 112913172 A * 6/2021 .......... H04L 5/0055
WO WO-2016123402 A1 * 8/2016 ........ H04L 27/0006
(Continued)

OTHER PUBLICATIONS

Ericsson:"Summary or E-mail Discussions on Uplink Control signaling", 3GPP Draft, 3GPP TSG-RAN WG1#87, R1-1613162 Summary of E-mail Discussions on Uplink Control Signaling, 3rd Generation Partnership Project (3GPP), Mobile Competence Centre, 650, Route Des Lucioles, F-06921 Sophia-Antipoli, vol. Ran WG1, No. Reno, NV, USA, Nov. 14, 2016-Nov. 18, 2016, Nov. 19, 2016 (Nov. 19, 2016), XP051191041, 24 pages, Retrieved from the Internet: URL: http://www.3gpp.org/ftp/tsg_ran/WG1_RL1/TSGR1_87/Docs/R1-1613162.zip, [retrieved on Nov. 19, 2016], p. 2, paragraph 6-8, p. 10, paragraph 4.
(Continued)

*Primary Examiner* — Michael J Moore, Jr.
(74) *Attorney, Agent, or Firm* — Liem T. Do

(57) ABSTRACT

Wireless communications systems and methods related to providing feedback for DL data are provided. A first wireless communication device communicates with a second wireless communication device, a first communication signal. The first wireless communication device communicates the second wireless communication device, a grant for retransmitting a feedback associated with the first communication
(Continued)

signal. The first wireless communication device communicates with the second wireless communication device, the feedback based on the grant.

28 Claims, 7 Drawing Sheets

(51) Int. Cl.
    *H04W 72/04*     (2009.01)
    *H04W 72/14*     (2009.01)
    *H04W 74/08*     (2009.01)

(52) U.S. Cl.
    CPC ..... *H04W 72/042* (2013.01); *H04W 72/0413* (2013.01); *H04W 72/14* (2013.01); *H04W 74/0808* (2013.01); *H04L 5/001* (2013.01)

(56) References Cited

U.S. PATENT DOCUMENTS

| | | | |
|---|---|---|---|
| 2017/0346605 A1* | 11/2017 | Chendamarai Kannan | H04W 72/0413 |
| 2018/0167941 A1* | 6/2018 | Zhang | H04W 72/0413 |
| 2018/0249496 A1* | 8/2018 | Radulescu | H04B 7/0695 |
| 2019/0110310 A1* | 4/2019 | Obregon | H04W 72/082 |
| 2019/0140783 A1* | 5/2019 | Yerramalli | H04W 72/14 |
| 2019/0182865 A1* | 6/2019 | Falahati | H04L 1/1812 |
| 2019/0342037 A1* | 11/2019 | Karaki | H04W 72/04 |
| 2019/0342911 A1* | 11/2019 | Talarico | H04W 80/02 |
| 2020/0228258 A1* | 7/2020 | Fan | H04L 5/0055 |
| 2020/0374933 A1* | 11/2020 | Lou | H04W 72/02 |
| 2021/0344451 A1* | 11/2021 | Hedayat | H04W 74/0816 |

FOREIGN PATENT DOCUMENTS

| | | | | |
|---|---|---|---|---|
| WO | WO-2017205669 A1 * | 11/2017 | | H04L 1/1614 |
| WO | 2018071853 A1 | 4/2018 | | |
| WO | WO-2019103809 A1 * | 5/2019 | | H04L 5/0082 |

OTHER PUBLICATIONS

International Search Report and Written Opinion—PCT/US2020/012933—ISAEPO—dated Mar. 26, 2020.

Mediatek Inc: "Enhancements on HARQ for NR-U Operation", 3GPP Draft, 3GPP TSG RAN WG1 Meeting #95, R1-1812358_Enhancements on HARQ for NR-U Operation_FINAL, 3rd Generation Partnership Project (3GPP), Mobile Competence Centre, 650, Route Des Lucioles, F-06921 Sophia-Antipolis Cedex, F, vol. RAN WG1, No. Spokane, USA, Nov. 12, 2018-Nov. 16, 2018, Nov. 11, 2018 (Nov. 11, 2018), XP051554267, 7 Pages, Retrieved from the Internet: URL: http://www.3gpp.org/ftp/Meetings%5F3GPP%5FSYNC/RAN1/Docs/R1%2D1812358%2Ezip, [retrieved on Nov. 11, 2018], p. 3, paragraph 2.2 figures 2 (c), 2(d).

VIVO: "Discussion on the Enhancements to Configured Grants", 3GPP Draft, 3GPP TSG RAN WG1 Ad-Hoc Meeting 1901, R1-1900113, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 12, 2019 (Jan. 12, 2019), XP051575738, 6 Pages, Retrieved from the Internet: URL: http://www.3gpp.org/ftp/tsg%5Fran/WG1%5FRL1/TSGR1%5FAH/NR%5FAH%5F1901/Docs/R1%2D1900113%2Ezip, [retrieved on Jan. 12, 2019], p. 6, [retrieved on Jan. 12, 2019], p. 6, paragraph 2.5.

* cited by examiner

TRIGGER RETRANSMISSION OF A FEEDBACK IN UNLICENSED SPECTRUM

CROSS REFERENCE TO RELATED APPLICATIONS & PRIORITY CLAIM

The present application claims priority to and the benefit of the U.S. Provisional Patent Application No. 62/792,718 filed Jan. 15, 2019, which is hereby incorporated by reference in its entirety.

TECHNICAL FIELD

This application relates to wireless communication systems, and more particularly to communicating a grant for retransmitting a feedback based on a missed transmission opportunity (TXOP).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may transmit a preamble to reserve a transmission opportunity (TXOP) in the shared channel and may communicate with a receiving node during the TXOP.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a first communication signal; communicating, by the first wireless communication device with the second wireless communication device, a grant for retransmitting a feedback associated with the first communication signal; and communicating, by the first wireless communication device with the second wireless communication device, the feedback based on the grant.

In an additional aspect of the disclosure, an apparatus includes a transceiver configured to communicate, with a second wireless communication device, a first communication signal; communicate, with the second wireless communication device, a grant for retransmitting a feedback associated with the first communication signal; and communicate, with the second wireless communication device, the feedback based on the grant.

In an additional aspect of the disclosure, for a computer-readable medium having program code recorded thereon, the program code includes code for causing a first wireless communication device to communicate, with a second wireless communication device, a first communication signal; code for causing the first wireless communication device to communicate, with the second wireless communication device, a grant for retransmitting a feedback associated with the first communication signal; and code for causing the first wireless communication device to communicate, with the second wireless communication device, the feedback based on the grant.

In an additional aspect of the disclosure, an apparatus includes means for communicating, with a second wireless communication device, a first communication signal; means for communicating, with the second wireless communication device, a grant for retransmitting a feedback associated with the first communication signal; and means for communicating, with the second wireless communication device, the feedback based on the grant.

Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

Figure 1:
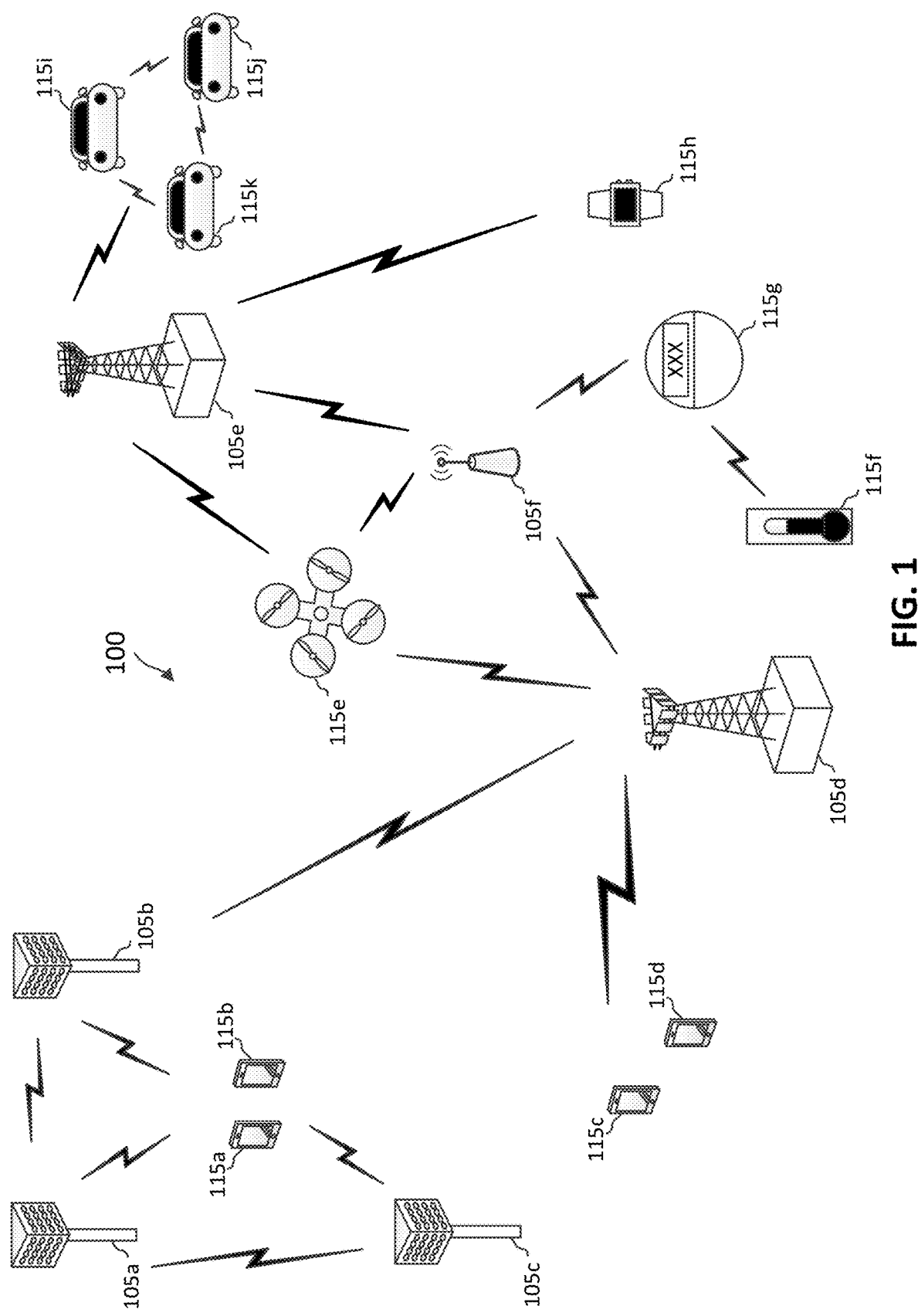
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+πMbps user experienced rates), and deep awareness with advanced discovery and optimizations.

The 5G NR may be implemented to use optimized OFDM-based waveforms with scalable numerology and transmission time intervals (TTIs); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may includes at least one element of a claim.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as with the small cell, the BS 105*f*. The macro BS 105*d* may also transmit multicast services which are subscribed to and received by the UEs 115*c* and 115*d*. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a physical DL control channel (PDCCH). The BS 105 may transmit a DL communication signal to the UE 115 via a physical DL shared channel (PDSCH) according to a DL scheduling grant. The UE 115 may transmit a UL communication signal to the BS 105 via a physical UL shared channel (PUSCH) and/or physical UL control channel (PUCCH) according to a UL scheduling grant.

The BS 105 and the UE 115 may further communicate based on a DL transmission parameter and a feedback transmission parameter corresponding to a TXOP. The DL transmission parameter indicates a time period between a DL grant and a corresponding DL transmission. The feedback transmission parameter indicates a time period between a DL data reception and a corresponding feedback for the DL data. A feedback signal may correspond to an ACK or NACK transmission. The DL transmission parameter and the feedback transmission parameter may be preconfigured by the network and may be indicated in units of slots. In the context of LTE or NR, the DL transmission parameter and the feedback transmission parameter may be indicated in DL control information (DCI) carried in a PDCCH. For example, if the BS 105 reserves a TXOP, the DL transmission parameter may indicate a value zero, and the feedback transmission parameter may indicate a value of four. The DL transmission parameter may be greater than zero, and the feedback transmission parameter may be less than or greater than four.

In an embodiment, the network 100 may be an NR network deployed over a licensed spectrum. The network 100 may operate over a shared channel, which may include shared frequency bands or unlicensed frequency bands, for example, at about 3.5 gigahertz (GHz), sub-6 GHz or higher frequencies in the mmWav band. In such an embodiment, a wireless communication device may share resources in the shared communication medium and may employ a listen-before-talk (LBT) procedure to reserve transmission opportunities (TXOPs) in the shared medium for communications. TXOPs may be non-continuous in time and may refer to an amount of time a station can send frames when it has won contention for the wireless medium. Each TXOP may include a plurality of slots and one or more medium sensing periods.

A wireless communication device may perform an LBT in the shared channel. When the LBT results in an LBT pass (the wireless communication device wins contention for the wireless medium), the wireless communication device may access the shared medium to transmit and/or receive data. In an example, the wireless communication device is the BS 105. When the LBT results in an LBT pass, the BS 105 may schedule a UE 115 for communications over the shared channel during the TXOP. In another example, the BS 105 may transmit to the UE 115, DL data and/or time domain resource location information regarding a transmission of a feedback for the DL data. A time domain resource may also be referred to as a feedback opportunity in the present disclosure. In turn, the UE 115 may receive the DL data from the BS 105 and transmit feedback for the DL data to the BS 105. The feedback may be an acknowledgement (ACK) indicating that reception of the DL data by the UE is successful (e.g., received the DL data without error) or may be a negative-acknowledgement (NACK) indicating that reception of the DL data by the UE is unsuccessful (e.g., including an error or failing an error correction).

In another example, the wireless communication device is the UE 115. When the LBT results in an LBT pass, the UE 115 may receive from the BS 105, DL data and/or time domain resource location information regarding the feedback opportunity for the DL data. The UE 115 may transmit feedback for the DL data to the BS 105 using the feedback opportunity. The UE 115's feedback transmissions are subject to the LBT constraint. Prior to transmitting the feedback, the UE 115 may perform an LBT that results in an LBT fail (the UE does not win contention for the wireless medium). Accordingly, the UE may miss an opportunity to transmit the feedback, and the BS would not receive the feedback as expected. Feedback that is expected but not received by the BS 105 may be referred to as a failed feedback.

The present disclosure provides techniques for communicating a grant for retransmission of a feedback. In some examples, the BS 105 provides a grant to trigger the retransmission of the failed feedback. It may be advantageous for the BS 105 to provide the UE 115 with a grant for retransmission of the failed feedback because the UE 115's ability to transmit feedback on the UL transmission depends on whether the UE 115 is able to gain access to the medium for transmission and/or reception of data. By providing the UE 115 with another opportunity for providing the failed feedback to the BS 105, it is more likely that the UE 115 will be able to retransmit the failed feedback to the BS 105. Additionally, rather than transmit the DL data again to the UE 115, the BS 105 may save resources and transmit the grant for retransmitting the feedback associated with the DL data to the UE 115. Accordingly, spectrum sharing performance may improve and feedback latency and/or retransmission scheduling latency may be reduced.

Figure 2:
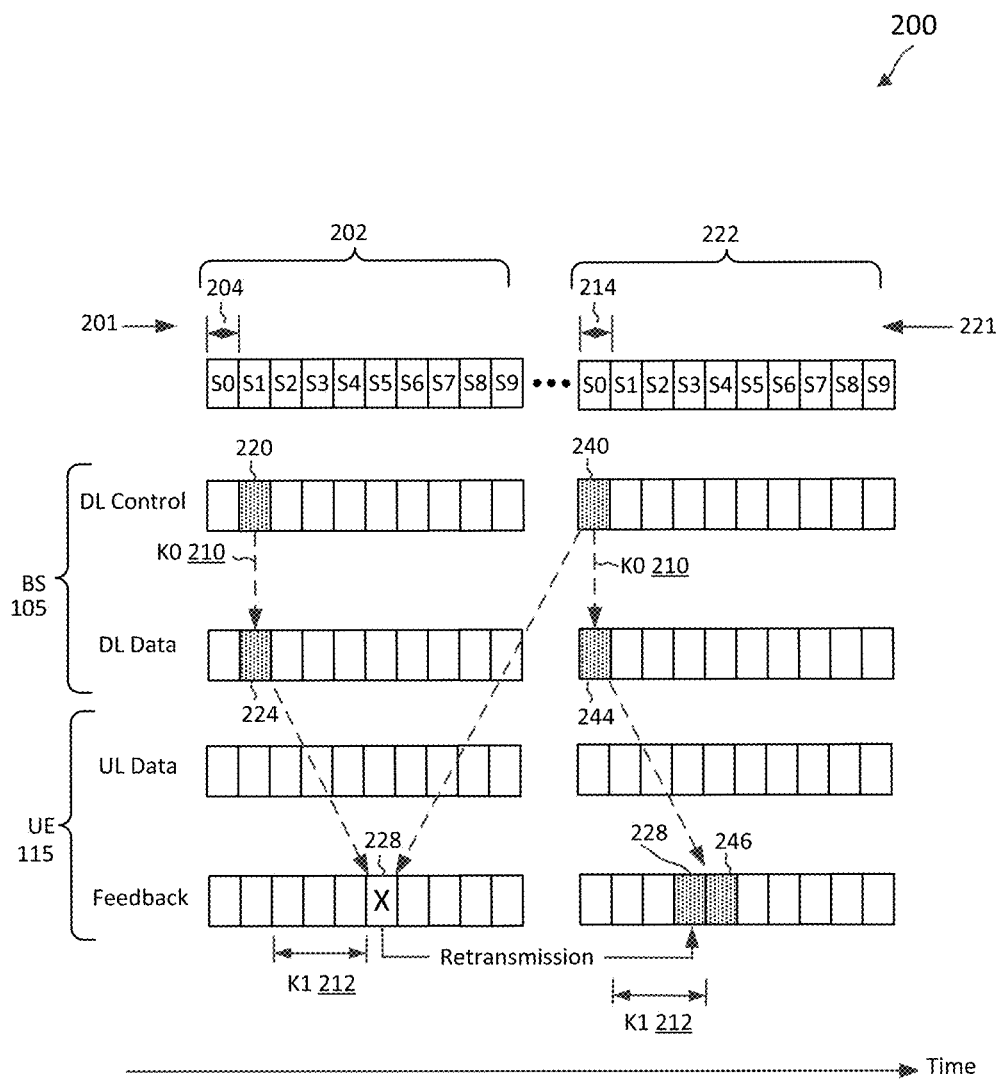
FIG. 2 illustrates a communication scheme for communicating a grant for retransmitting a feedback according to some embodiments of the present disclosure.

FIG. 2 illustrates a communication scheme 200 for communicating a grant for retransmitting a feedback according to some embodiments of the present disclosure. The communication scheme 200 may correspond to a communication scheme between a BS 105 and a UE 115 of the network 100. In FIG. 2, the x-axis represents time in some constant units. FIG. 2 shows a structure 201, 221 of a TXOP 202, 222, respectively, in a shared channel. The TXOP 202, 222 includes a plurality of slots 204, 214, respectively, in time. The number of slots within a TXOP may vary depending on the embodiments.

For simplicity of illustration and discussion, FIG. 2 illustrates the TXOP 202, 222 including ten slots 204, 214 indexed from S0 to S9. A BS may communicate with a UE in units of slots. The slots may also be referred to as TTIs. Each slot or TTI carries a medium access control (MAC) layer transport block. Each slot may include a number of symbols in time and a number of frequency tones in frequency. Each slot may include a DL control portion followed by at least one of a subsequent DL data portion, UL data portion, and/or a UL control portion. In the context of LTE or NR, the DL control portion, the DL data portion, the UL data portion, and the UL control portion may be referred to as a PDCCH, a PDSCH, a PUSCH, and a PUCCH, respectively.

The pattern-filled boxes represent transmissions of DCI, DL data, UL data, an ACK, and/or an NACK in corresponding slots. While an entire slot is pattern-filled, a transmission may occur only in a corresponding portion of the slot. Additionally, an "X" in a box represents a failed transmission (e.g., due to an LBT fail). A second attempt to transmit a feedback may be referred to as a retransmission of the feedback in the present disclosure.

The BSs contending for a TXOP in a shared channel may perform an LBT in the shared channel. If the LBT results in an LBT pass, the BS 105 may transmit DCI 220 in the slot 204 indexed S1 (e.g., in a DL control portion of the slot 204). The DCI 220 may indicate a DL grant for the UE 115 in the same slot 204 indexed S1 (e.g., K0=0). Thus, the BS 105 transmits a DL data signal 224 to the UE 115 in the slot 204 indexed S1 (e.g., in a DL data portion of the slot 204). The UE may receive the DCI 220 and receive the DL data signal 224 based on the DL grant.

After receiving the DL data signal 224, the UE 115 may transmit a feedback for the DL data signal 224 to the BS 105. The BS 105 may provide the UE 115 with a feedback opportunity for the DL data signal 224 in the slot 204 indexed S5. A feedback opportunity may refer to a resource location (e.g., a time-frequency resource) during which the UE 115 may provide feedback (e.g., an ACK/NACK) for a DL data signal. A feedback opportunity may be transmitted at different locations within a time domain resource. An acknowledgement resource indicator (ARI) may communicate a resource location of a feedback opportunity and may be, for example, a resource bloc. Accordingly, the BS 105 may configure a feedback opportunity for the UE 115 to transmit feedback for the DL data signal 224 via the TXOP structure configuration. The BS 105 may indicate the resource (e.g., slot) that may be used by the UE 115 for providing the feedback (e.g., in the slot 204 indexed S5). The resource may be provided via a TXOP structure configuration and/or a control channel information detected by the UE 115. The BS 105 may indicate the time domain resource location information for the feedback opportunity as being the slot 204 indexed S5. Accordingly, the UE 115 may use the slot 204 indexed S5 to transmit feedback for the DL data signal 224.

The feedback may report a reception status of the DL data signal 224 to the BS 105 by transmitting an ACK/NACK signal 228 in the slot 204 indexed S5 (e.g., in a UL data portion or a UL control portion of the slot 204) based on the ARI. The slot 204 indexed S5 is a fourth slot from the slot 204 indexed S1. The ACK/NACK signal 228 refers to a feedback signal carrying an ACK or an NACK for the DL data signal 224. The UE 115 may transmit an ACK when the reception of the DL data signal 224 is successful (e.g., received the DL data without error). Alternatively, the UE may transmit an NACK when the reception of the DL data signal 224 is unsuccessful (e.g., including an error or failing an error correction).

The ACK/NACK signal 228 may be associated with a hybrid automatic repeat request (HARQ) process. In a HARQ process, a transmitting node may transmit various coded versions of information data to a receiving node. For example, the transmitting node may transmit a first coded version of information data to the receiving node. Upon receiving an NACK signal from the receiving node, the transmitting node may transmit a second coded version of the information data to the receiving node. The receiving node may combine the received first coded version and the received second coded version for error correction when both the received first coded version and the received second coded version are erroneous.

The UEs may perform an LBT in the shared channel prior to the feedback opportunity (e.g., the slot 204 indexed S5). The UE 115's ability to transmit the ACK/NACK signal 228 during the configured feedback opportunity depends on whether the UE is able to gain access to the medium for transmission and/or reception of data. If the LBT results in an LBT pass, the UE 115 may transmit the ACK/NACK signal 228 in the slot 204 indexed S5. Alternatively, if the LBT results in an LBT fail, the UE 115 may fail to transmit the ACK/NACK signal 228 based on a missed TXOP. Accordingly, the BS 105 does not receive the ACK/NACK signal 228 when expected (e.g., in the slot 204 indexed S5). In the example illustrated in FIG. 2, the slot 204 indexed S5 is marked with an "X," indicating that the UE 115 was unable to transmit the ACK/NACK signal 228 to the BS 105.

If the BS 105 does not receive the ACK/NACK signal 228 from the UE 115 as expected, rather than retransmit the DL data signal 224 to the UE 115, the BS 105 may explicitly trigger a PUCCH report (e.g., retransmission of the feedback for the DL data signal 224). For example, the BS 105 may transmit a communication signal indicating a grant for retransmitting the failed feedback associated with the DL data signal 224 to the UE 115. In this way, the UE 115 may receive a trigger with an indication to retransmit the failed feedback for the DL data signal 224.

Referring to the TXOP 222, the parameter 210 may indicate a value zero (e.g., K0=0), and the parameter 212 may indicate a value three (e.g., K1=3). Prior to transmitting in the shared channel, the BS 105 performs an LBT. If the LBT results in an LBT pass, the BS 105 may transmit DCI 240 in the slot 214 indexed S0 (e.g., in a DL control portion of the slot 214) to the UE 115. The DCI 240 may indicate a grant for retransmitting the failed ACK/NACK signal 228 associated with the DL data signal 224. The UE 115 may receive the DCI 240 indicating the grant for retransmitting the failed ACK/NACK signal 228 and accordingly transmit the ACK/NACK signal 228 based on the grant to the BS 105. The DCI 240 may indicate an ARI that references the slot 214 indexed S3 for transmission of the ACK/NACK signal 228. The UE 115 may transmit the ACK/NACK signal 228 in the slot 214 indexed S3 (e.g., in a UL data portion or a UL control portion of the slot 214) to the BS 105.

In some examples, the BS 105 may combine the grant for retransmitting the ACK/NACK signal 228 with a DL grant. For example, the DCI 240 may indicate the grant for retransmitting the ACK/NACK signal 228 and may also indicate a DL grant for the UE 115 in the same slot 214 indexed S0 (e.g., K0=0). The BS 105 transmits a DL data signal 244 to the UE 115 in the slot 214 indexed S0 (e.g., in a DL data portion of the slot 214) based on the DL grant. The UE may receive the DCI 240, which indicates the grant for retransmitting the ACK/NACK signal 228 and the DL grant, and the DL data signal 244 based on the same grant indicated in the DCI 240. In this example, the UE 115 may transmit the ACK/NACK signal 228 in the slot 214 indexed S3 (e.g., in a UL data portion or a UL control portion of the slot 214) and may also transmit an ACK/NACK signal 246 in the slot 214 indexed S4 (e.g., K1=3) (e.g., in a UL data portion or a UL control portion of the slot 214). The ACK/NACK signal 246 indicates reception of the DL data signal 244 by the UE 115. The DCI 240 may indicate an ARI that references the slot 214 indexed S4 for transmission of the ACK/NACK signal 246. The ARI that references the slot 214 indexed S3 for transmission of the ACK/NACK signal 228 and may be the same or different from the ARI that references the slot 214 indexed S4 for transmission of the ACK/NACK signal 246.

The ACK/NACK signal 228 and the ACK/NACK signal 246 are shown as being transmitted in different slots (e.g., slot 214 indexed S3 and S4, respectively). It should be understood that in other examples, the ACK/NACK signal 228 and the ACK/NACK signal 246 may be transmitted in the same slot. Additionally, as will be explained further below in relation to FIGS. 3 and 4, transmission of the ACK/NACK signal 228 and the ACK/NACK signal 246 may have the same spatial relation information or different spatial relation information relative to each other. Moreover, although the DCI is described as indicating an ARI that references a particular slot for transmission within a TXOP, it should be understood that the DCI may indicate a feedback transmission parameter indicating a time period between a DL data reception and a corresponding feedback for the DL data.

Figure 3:
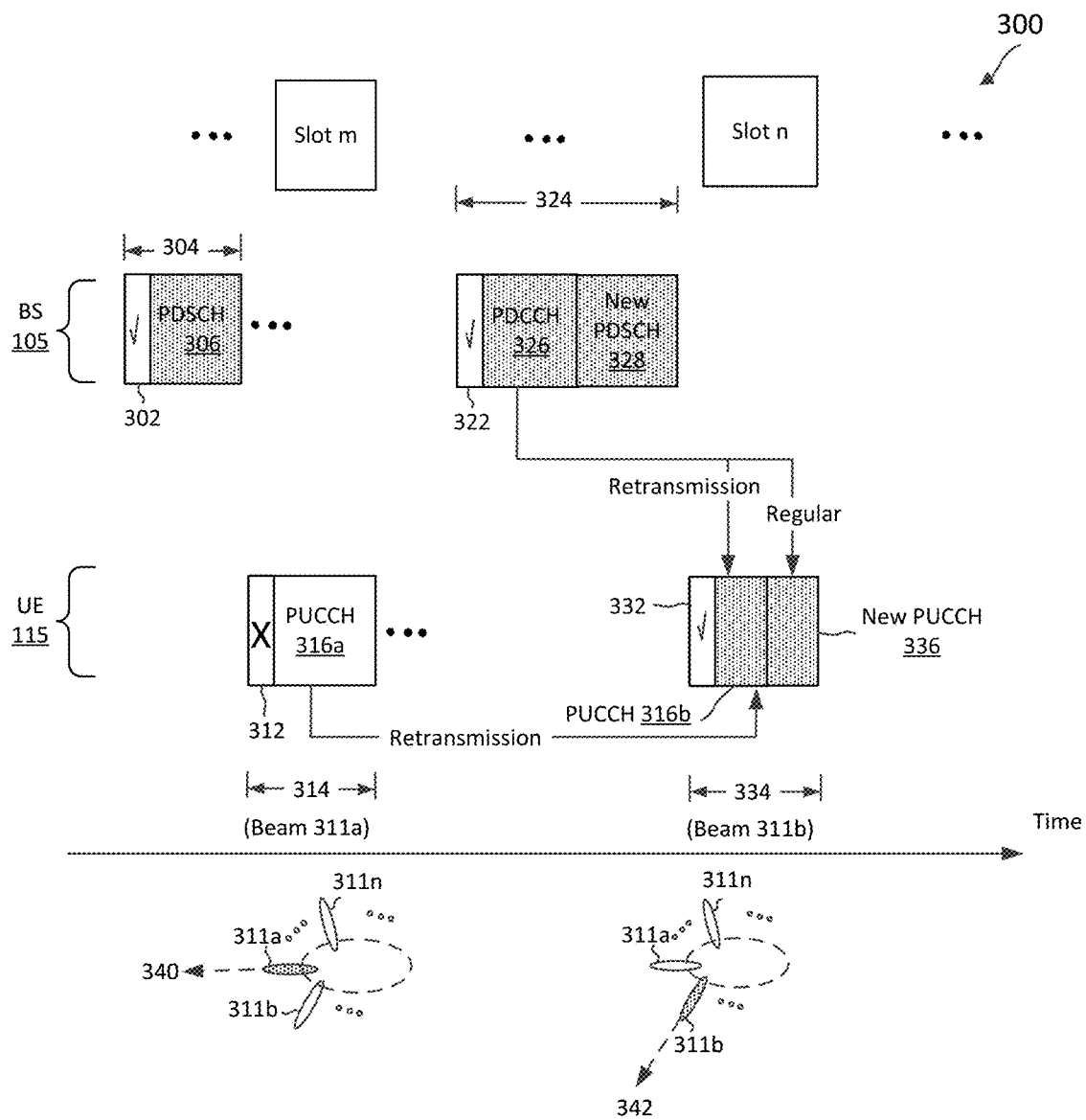
FIG. 3 illustrates a communication scheme for communicating a grant for retransmitting a feedback according to some embodiments of the present disclosure.

FIG. 3 illustrates a communication scheme 300 for communicating a grant for retransmitting a feedback according to some embodiments of the present disclosure. The communication scheme 300 may be employed by UEs such as the UEs 115 and by BSs such as BSs 105 in a network such as the network 100. In FIG. 3, the BS 105 may perform an LBT 302 to obtain a TXOP 304 for DL transmission in a PDSCH 306 to the UE 115. A check mark shown in an LBT indicates an LBT pass, and an "X" shown in an LBT indicates an LBT fail. The checkmark shown in the LBT 302 indicates that the LBT 302 results in an LBT pass. Accordingly, the BS 105 transmits the DL transmission via the PDSCH 306 to the UE 115.

The UE 115 may receive the PDSCH 306 from the BS 105 and desire to transmit a feedback associated with the PDSCH 306 to the BS 105. The BS 105 may configure the UE 115 with a feedback opportunity 314 in the slot m for transmitting a feedback for the PDSCH 306. Prior to transmitting the feedback opportunity 314, the UE 115 may perform an LBT 312. The LBT 312 results in a LBT failure. Accordingly, the UE 115 fails to transmit the PUCCH 316a in the slot m based on a missed feedback opportunity 314.

The BS 105 may expect to receive the PUCCH 316a in the slot m during the feedback opportunity 314. In response to a determination that the feedback for the PDSCH 306 (e.g., PUCCH 316a) has failed, the BS 105 may trigger retransmission of the feedback. The BS 105 may perform an LBT 322 to obtain a TXOP 324 to transmit a PDCCH 326 to the UE 115. The checkmark shown in the LBT 322 indicates that the LBT 322 results in an LBT pass. The PDCCH 326 may indicate a trigger for retransmitting a failed feedback for the PDSCH 306 (e.g., the failed PUCCH 316a). The PDCCH 326 may indicate a grant for the retransmission of the failed feedback in the sense that a grant had already been transmitted for the PDSCH 306 (e.g., the BS may have indicated a grant during the TXOP 304) to the UE 115 and/or the UE 115 had already attempted to transmit the PUCCH 316a. In some examples, the grant indicated by the PDCCH 326 may indicate an UL resource for a retransmission of PUCCH 316a (e.g., the ACK/NACK for a previous PDSCH 306).

The UE 115 may receive the PDCCH 326 indicating the grant for retransmitting the feedback associated with the PDSCH 306. The UE 115 may perform an LBT 332 to obtain a feedback opportunity 334 to transmit the PUCCH 316b based on the grant for retransmitting the feedback (e.g., PUCCH 316a) indicated in the PDCCH 326. The checkmark shown in the LBT 332 indicates that the LBT 332 results in an LBT pass. The UE 115 may transmit the PUCCH 316b in the slot n during the feedback opportunity 334. The PUCCH 316b may include the same feedback as the PUCCH 316a, and "retransmitting" the PUCCH 316a may refer to transmitting the PUCCH 316b. Additionally, to further distinguish the PUCCH 316a from the PUCCH 316b, the PUCCH 316a may also be referred to as a failed PUCCH 316a.

Additionally, the PDCCH 326 may indicate a DL grant associated with a new PDSCH 328. The BS 105 may transmit the new PDSCH 328 to the UE 115 during the TXOP 324 (e.g., in a DL data portion of the slot). The UE 115 may receive the new PDSCH 328 based on the DL grant indicated by the PDCCH 326. The PDCCH 326 may indicate a new feedback grant for transmitting a feedback for the PDSCH 328. In some examples, the trigger for the failed feedback (e.g., PUCCH 316a) may be combined with the new feedback grant associated with the new PDSCH 328.

After the UE 115 receives the new PDSCH 328, the UE 115 may transmit a new PUCCH 336 based on the new feedback grant indicated in the PDCCH 326. The new PUCCH 336 may be feedback for the new PDSCH 328. Accordingly, the transmission of the PUCCH 316b and the new PUCCH 336 may be triggered by the same grant. Additionally, the PUCCH 316b and the new PUCCH 336 correspond to different PDSCHs. In an example, the PUCCH 316b indicates feedback for the PDSCH 306, and the new PUCCH 336 indicates feedback for the new PDSCH 328. Accordingly, in some examples, the grant indicated by the PDCCH 326 may indicate a first UL resource for a retransmission of PUCCH 316a (e.g., the ACK/NACK for a previous PDSCH 306), a DL resource for new DL data (e.g., new PDSCH 328), and a second UL resource for a new transmission of PUCCH (e.g., new PUCCH 336).

Although the UE 115 may transmit the PUCCH 316b and the new PUCCH 336 in the same slot n during the feedback opportunity 334 (as shown in FIG. 3), it should also be understood that the BS may configure the UE 115 to transmit the PUCCH 316b and the new PUCCH 336 in different slots (e.g., n and n+1, as shown in FIG. 2). The slots between the PUCCH 316b and the new PUCCH 336 transmissions may be spaced apart in accordance with an ARI. Additionally, the resources for the PUCCH 316b and the new PUCCH 336 triggered in the same grant may be configured separately by two ARIs, or linked together. Different bits may be used to indicate time domain resource location information. In an example, a single ARI field may indicate the time domain resource locations for both the PUCCH 316b and the new PUCCH 336 transmissions. In another example, two different ARI fields may indicate the time domain resource locations for the PUCCH 316b and the new PUCCH 336 transmissions.

Further, although the PUCCH 316a associated with the feedback opportunity 314 and the PUCCH 316b associated with the feedback opportunity 334 are shown as being in the same slot (e.g., slot n, as shown in FIG. 3), it should be understood that the PUCCH 316a and the PUCCH 316b may be transmitted in different slots (as shown in FIG. 2). For example, the UE 115 may have attempted to transmit the PUCCH 316a in a slot m during the feedback opportunity 314 and may transmit the PUCCH 316b in a slot n during the feedback opportunity 334, where m and n correspond to different slots in a TXOP as configured by the BS.

Additionally, in some examples, the BS 105 can coordinate with the UE 115 to cooperatively schedule, beamform, and/or transmit data in the network 100. Substantial gain may be achieved through greater use of a multiple antenna system. In mmWave access, for example, a large number of antenna elements may be used to take advantage of shorter wavelengths, and to enable beamforming and beam-tracking. Beamforming may be used to avoid transmission losses when using, for example, mmWave frequencies. Beamforming combines signals from multiple antenna elements in an antenna array, so that the combined signal level increases when several signal phases align (constructive interference). The signals from each antenna element are transmitted with a slightly different phase (delay) to produce a beam directed towards the receiver. At higher frequencies, propagation and penetration losses are higher. Beamforming techniques may be used to increase the signal level received by a device. A beamformer combines energy over its aperture, obtaining a certain antenna gain in a given direction while having attenuation in others. Each of the BS 105 and the UE 115 may steer its energy in a particular direction. Different transmission beams may correspond to different beam patterns.

Additionally, the BS may configure the UE 115 with different spatial parameters (e.g., beam directions) for transmitting the PUCCH 316b and the PUCCH 336. Thus, the UE 115 may steer its energy in a particular direction during a PUCCH transmission according to the spatial parameters. In the example illustrated in FIG. 3, the UE 115 may transmit PUCCH in different beam directions. The terms "transmission beam" and "beam" may be used interchangeably in the present disclosure. The UE 115 may include an array of antenna elements and may configure the array of antenna elements to form a transmission beam 311 in a certain direction. Transmission beams 311a, 311b, . . . , and 311n have different patterns. The UE 115 may have attempted to transmit the PUCCH 316a over a transmission beam 311a (e.g., shown as pattern-filled) directing towards a direction 340. During the feedback opportunity 334, the UE 115 may transmit the PUCCH 316b over a transmission beam 311b (e.g., shown as pattern-filled) directing towards a direction 342. The UE 115 may also transmit the new PUCCH 336 over the transmission beam 311b directing towards the direction 342. In this example, the PUCCH 316a associated with feedback opportunity 314 and the PUCCH 316b associated with the feedback opportunity 334 may have the different spatial relation information. In another example, the PUCCH 316a and the PUCCH 316b may have the same spatial relation information. In this example, the UE 115 may have attempted to transmit the PUCCH 316a over the same transmission beam as the UE 115 uses to transit the PUCCH 316b (e.g., transmission beam 311a). Additionally, the PUCCH 316b and the new PUCCH 336 triggered in the same grant may have the same or different spatial relation information relative to each other.

Figure 4:
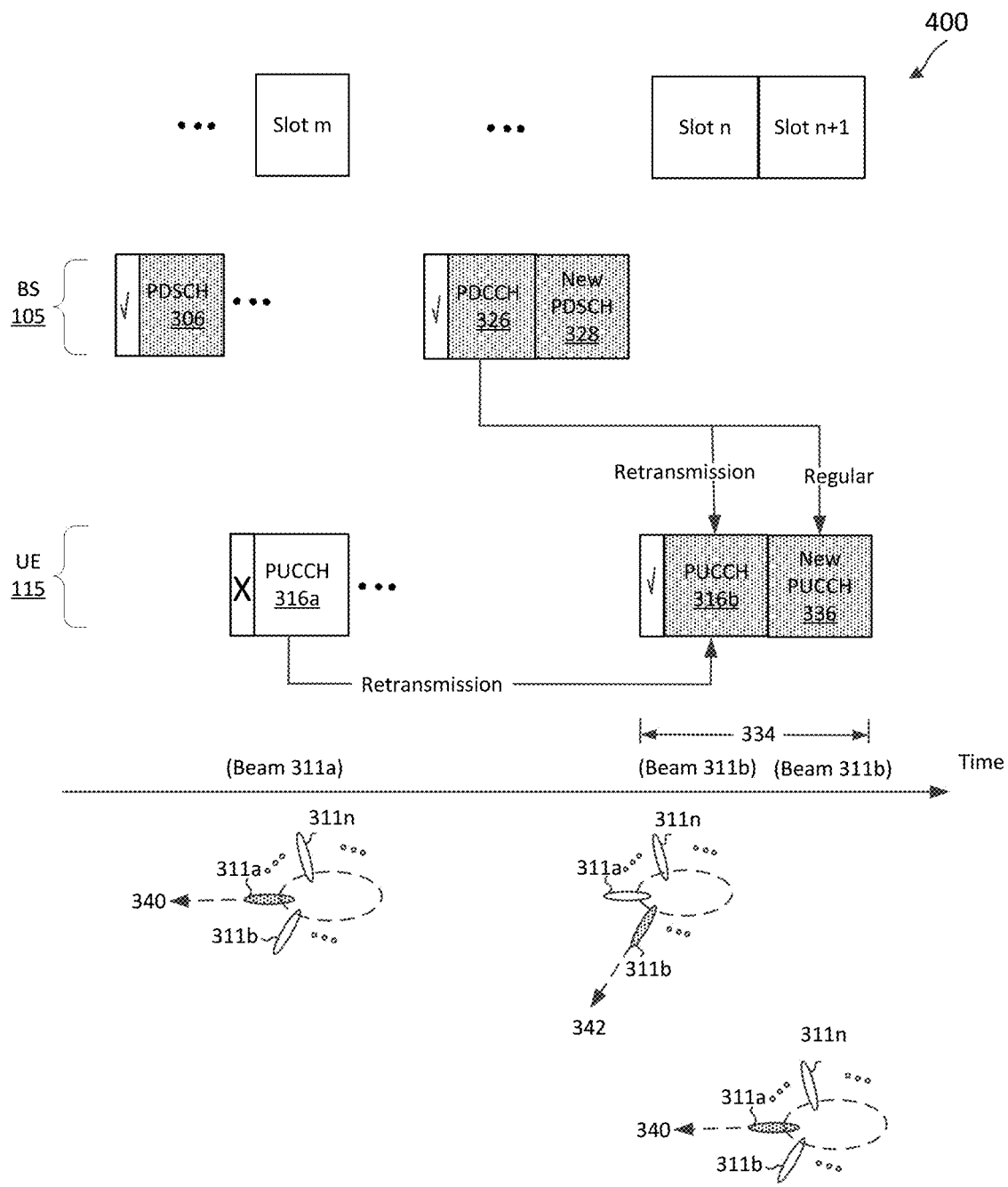
FIG. 4 illustrates a communication scheme for communicating a grant for retransmitting a feedback according to some embodiments of the present disclosure.

FIG. 4 illustrates a communication scheme 400 for communicating a grant for retransmitting a feedback according to some embodiments of the present disclosure. The communication scheme 400 may be employed by UEs such as the UEs 115 and by BSs such as BSs 105 in a network such as the network 100. Some aspects from FIG. 3 are shown in FIG. 4. For example, the BS 105 transmits the PDSCH 306. The UE 115 fails to transmit in a slot m, the PUCCH 316a over the transmission beam 311a (e.g., shown as pattern-filled) directing towards the direction 340. Additionally, the BS 105 transmits the PDCCH 326 and the new PDSCH 328. The UE 115 receives the PDCCH 326 and the new PDSCH 328 from the BS 105. The PDCCH 326 may indicate a grant for retransmitting a feedback associated with the PDSCH 306. The PDCCH 326 may also indicate a grant for the new PDSCH 328 and a feedback for the new PDSCH 328.

In the example illustrated in FIG. 4, the UE 115 transmits the PUCCH 316b over the transmission beam 311b (e.g., shown as pattern-filled) directing towards the direction 342 in a slot n during the feedback opportunity 334. As discussed, the UE 115 attempted to transmit the PUCCH 316a in the slot m during a feedback opportunity, where m and n correspond to different slots in a TXOP. Additionally, the UE 115 transmits the new PUCCH 336 over the transmission beam 311a (e.g., shown as pattern-filled) directing towards the direction 340 in a slot n+1 during the feedback opportunity 334. Accordingly, the UE 115 may transmit the PUCCH 316b and the new PUCCH 336 in different slots and/or using different beam patterns.

If the BS 105 determines that a feedback from a UE 115 has failed, the BS 105 may trigger a PUCCH report from the UE 115. The BS 105 may request the UE 115 to include, for example, a payload size of the failed feedback (e.g., PUCCH 316a), a bitmask of the DL grants reported in the failed feedback, and/or the payload of the failed feedback. In an example, the grant may request the UE 115 to provide the payload size of the failed feedback, the bitmask of the DL grants reported in the failed feedback, and/or the payload of the failed feedback, among other information.

The payload size of the failed feedback associated with a communication signal corresponds to a number of ACK/NACKs for the communication signal, and the payload of the failed feedback may refer to the ACK/NACKs for the communication signal. In some examples, the failed PUCCH 316a may include feedback for one or more PDSCHs. If the BS 105 does not receive the PUCCH 316a, an ambiguity may exist between the BS 105 and the UE 115 with regard to payload size such that the BS 105 did not properly decode the PUCCH 316a. Accordingly, in the triggered retransmission, the BS 105 may request the UE 115 to send the payload size of the failed PUCCH 316a. The bitmask may indicate which DL grants the UE 115 has received within a window of time. The bitmask may be used to indicate which grants (e.g., PDSCH) the UE 115 received for the same original PUCCH feedback. From the bitmask, the BS 105 may determine the payload size of the previously received PUCCH.

Figure 5:
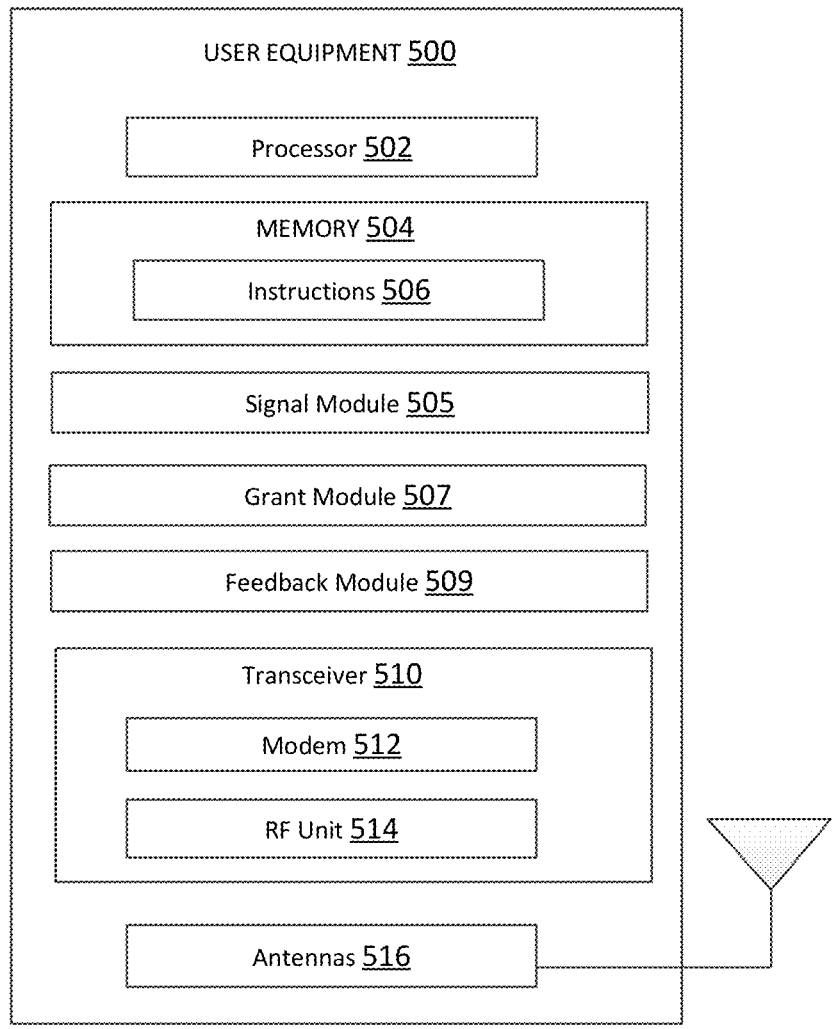
FIG. 5 is a block diagram of an example user equipment (UE) according to embodiments of the present disclosure.

FIG. 5 is a block diagram of an example UE 500 according to embodiments of the present disclosure. The UE 500 may be a UE 115 as discussed above. As shown, the UE 500 may include a processor 502, a memory 504, a signal module 505, a grant module 507, a feedback module 509, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 115 in connection with embodiments of the present disclosure. The instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the signal module 505, the grant module 507, and the feedback module 509, may be implemented via hardware, software, or combinations thereof. For example, each of the signal module 505, the grant module 507, and the feedback module 509 may be implemented as a processor, circuit, and/or instructions 506 stored in the memory 504 and executed by the processor 502. Each of the signal module 505, the grant module 507, and the feedback module 509 may be used for various aspects of the present disclosure.

The signal module 505 may be configured to communicate with a wireless communication device, a first communication signal. The first communication signal may be a PDSCH that carries DL data that is associated with a DL grant. In an example, the signal module 505 receives the first communication signal from the BS 105. Referring back to FIG. 2, the DL data signal 224 received via the PDSCH may correspond to the first communication signal.

The grant module 507 may be configured to communicate with the wireless communication device, a grant for retransmitting a feedback associated with the first communication signal. In an example, the grant module 507 receives a DCI indicating the grant for retransmitting the feedback. The grant module 507 may have already received a previous grant for transmitting the feedback associated with the first communication signal. The feedback module 509 may have been unable to transmit the feedback based on the previous grant due a missed feedback opportunity.

Referring back to FIG. 2, the DCI 240 may indicate the grant for retransmitting the ACK/NACK signal 228, which indicates the feedback for the DL data signal 224. The DCI 240 may also indicate a DL grant for the DL data signal 244 in the slot 214 indexed S0 and a new feedback grant for the DL data signal 244 in the slot 214 indexed S4. Accordingly, the grant to trigger the retransmission of the ACK/NACK signal 228 may be combined with the new feedback grant associated with the DL data signal 244.

The feedback module 509 may be configured to communicate with the wireless communication device, the feedback based on the grant. In an example, the feedback module 508 may perform a LBT and if the LBT results in a LBT pass, the feedback module 508 may transmit the feedback based on the grant to the BS 105. Referring back to FIG. 2, the ACK/NACK signal 228 in the slot 214 indexed S3 may correspond to the feedback based on the grant indicated in the DCI 240. The feedback may be an ACK indicating that the UE 115 received the DL data successfully or a NACK indicating that the UE 115 did not receive the DL data successfully.

As shown, the transceiver 510 may include the modem subsystem 512 and the RF unit 514. The transceiver 510 can be configured to communicate bi-directionally with other devices, such as the BSs 105 and/or another core network element. The modem subsystem 512 may be configured to modulate and/or encode the data from the memory 504, the signal module 505, the grant module 507, and/or the feedback module 509 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 500 to enable the UE 500 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The antennas 516 may include multiple antennas of similar or different designs in order to sustain multiple transmission links. The RF unit 514 may configure the antennas 516.

Figure 6:
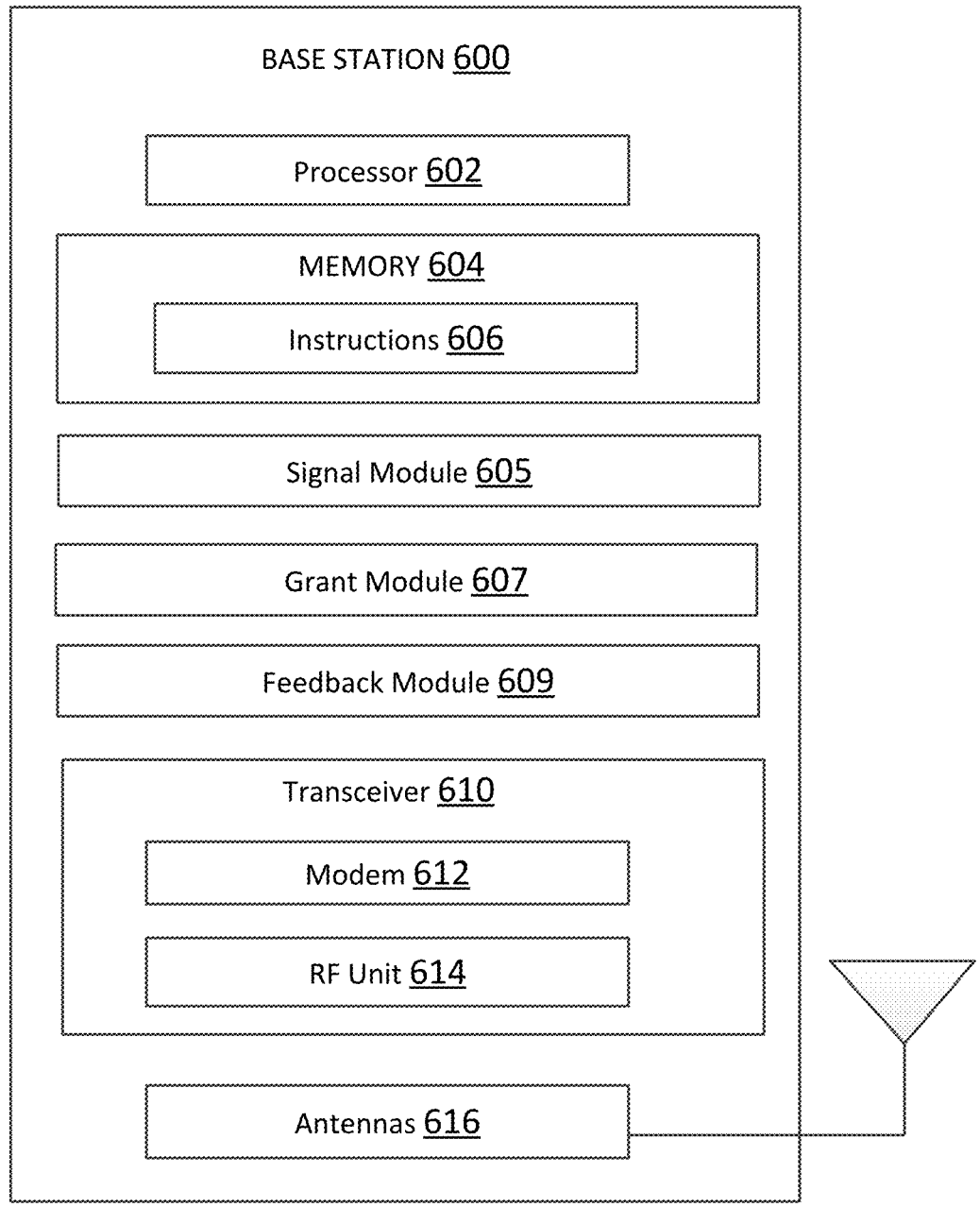
FIG. 6 is a block diagram of an example base station (BS) according to embodiments of the present disclosure.

FIG. 6 is a block diagram of an example BS 600 according to embodiments of the present disclosure. The BS 600 may be a BS 105 as discussed above. As shown, the BS 600 may include a processor 602, a memory 604, a signal module 605, a grant module 607, a feedback module 609, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. The instructions 606 may also be referred to as code, which may be interpreted broadly to include any type of computer-readable statement(s) as discussed above with respect to FIG. 5.

Each of the signal module 605, the grant module 607, and the feedback module 609 may be implemented via hardware, software, or combinations thereof. For example, each of the signal module 605, the grant module 607, and the feedback module 609 may be implemented as a processor, circuit, and/or instructions 606 stored in the memory 604 and executed by the processor 602. Each of the signal module 605, the grant module 607, and the feedback module 609 may be used for various aspects of the present disclosure.

The signal module 605 may be configured to communicate with a wireless communication device, a first communication signal. The first communication signal may be a PDSCH that carries DL data that is associated with a DL grant. In an example, the signal module 505 transmits the first communication signal to the UE 115. Referring back to FIG. 2, the DL data signal 224 transmitted via the PDSCH may correspond to the first communication signal.

The grant module 607 may be configured to communicate with the wireless communication device, a grant for retransmitting a feedback associated with the first communication signal. In an example, the grant module 607 transmits a DCI indicating the grant for retransmitting the feedback. Referring back to FIG. 2, the DCI 240 may indicate the grant for retransmitting the ACK/NACK signal 228, which indicates the feedback for the DL data signal 224. The DCI 240 may also indicate a new feedback grant for a new DL data signal 244 (e.g., PDSCH signal).

In an example, the grant module 607 may detect a missed feedback opportunity. In response to detecting the missed feedback opportunity, the grant module 607 may transmit a retransmission feedback grant (e.g., the grant for retransmitting the feedback associated with the first communication signal).

The feedback module 609 may be configured to communicate with the wireless communication device, the feedback based on the grant. In an example, the feedback module 609 may receive the feedback based on the grant from the UE 115. Referring back to FIG. 2, the ACK/NACK signal 228 in the slot 214 indexed S3 may correspond to the feedback based on the grant indicated in the DCI 240. The feedback may be an ACK indicating that the UE 115 received the DL data successfully or a NACK indicating that the UE 115 did not receive the DL data successfully.

As shown, the transceiver 610 may include the modem subsystem 612 and the RF unit 614. The transceiver 610 can be configured to communicate bi-directionally with other devices, such as the UEs 115 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or another BS. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 600 to enable the BS 600 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to embodiments of the present disclosure. The antennas 616 may further receive data messages transmitted from other devices and provide the received data messages for processing and/or demodulation at the transceiver 610. The antennas 616 may include multiple antennas of similar or different designs in order to sustain multiple transmission links.

Figure 7:
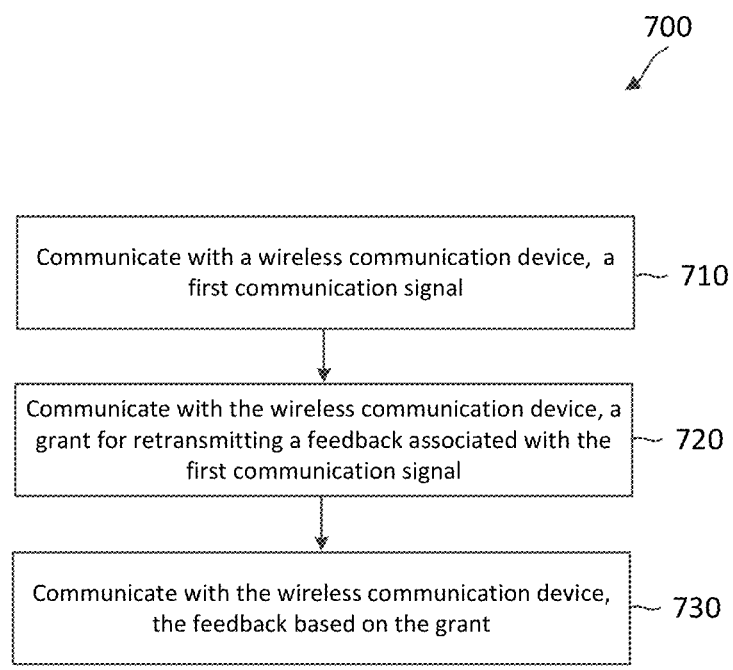
FIG. 7 is a flow diagram of a method for communicating a grant for retransmitting a feedback according to some embodiments of the present disclosure.

FIG. 7 is a flow diagram of a method 700 for communicating a grant for retransmitting a feedback according to some embodiments of the present disclosure. Steps of the method 700 can be executed by a computing device (e.g., a processor, processing circuit, and/or other suitable component) of a wireless communication device or other suitable means for performing the steps. For example, a wireless communication device, such as the UE 115 or UE 500, may utilize one or more components, such as the processor 502, the memory 504, the signal module 505, the grant module 507, the feedback module 509, the transceiver 510, the modem 512, and/or the one or more antennas 516, to execute the steps of method 700. In another example, a wireless communication device, such as the BS 105 or BS 600, may utilize one or more components, such as the processor 602, the memory 604, the signal module 605, the grant module 607, the feedback module 609, the transceiver 610, the modem 612, and/or the one or more antennas 616, to execute the steps of method 700. The method 700 may employ similar mechanisms as in the communication schemes 200, 300, and 400 as described with respect to FIGS. 2, 3, and 4, respectively. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 710, the method 700 includes communicating with a wireless communication device, a first communication signal. In an example, the first communication signal is transmitted via the PDSCH. At step 720, the method 700 includes communicating with the wireless communication device, a grant for retransmitting a feedback associated with the first communication signal. At step 730, the method 700 includes communicating with the wireless communication device, the feedback based on the grant.

In some examples, the first wireless communication device may communicate with the second communication device, a second grant for transmitting the feedback associated with the first communication signal. The second grant may be communicated before the first grant for retransmitting the feedback. The first wireless communication device may communicate with the second communication device, DCI indicating the second grant. Additionally, the first wireless communication device may perform a LBT in an unlicensed spectrum for communicating the feedback based on the second grant. The LBT may result in a LBT fail. Accordingly, the first wireless communication device may be unable to communicate the feedback based on the second grant (e.g., due to a missed feedback opportunity). The first wireless communication device may perform the LBT for communicating the feedback using a first beam. In an example, the first wireless communication device communicates the feedback based on the first grant using a second beam different from the first beam. In this example and referring to FIG. 3, the first wireless communication device may communicate the PUCCH 316a and the PUCCH 316b using different beams (e.g., transmission beam 311a and transmission beam 311b, respectively). In another example, the first wireless communication device communicates the feedback based on the first grant using the first beam. In this example and referring to FIG. 3, the first wireless communication device may communicate the PUCCH 316a and the PUCCH 316b using the same beam (e.g., transmission beam 311a).

In some examples, the first wireless communication device may communicate with the second wireless communication device, a second communication signal. The grant for retransmitting the feedback for the first communication signal may also be for transmitting a second feedback associated with the second communication signal. The first wireless communication device may communicate with the second wireless communication device, the second feedback based on the grant. In an example, the first wireless communication device may communicate, during a first TXOP, the first feedback in a first slot and the second feedback in a second slot. The first and second slots correspond to the same slot or are different slots. Additionally, the first and second slots may be configured separately by two different acknowledgement resource indicators (ARIs). In an example, the wireless communication device may communicate the grant by communicating a first acknowledgement resource indicator (ARI) indicating a first resource in the first slot for the first feedback and communicating a second ARI indicating a second resource in the second slot for the second feedback. The first and second resources may be UL resources.

In an example, the first wireless communication device may communicate the first feedback using a first beam and communicate the second feedback using a second beam different from the first beam. In another example, the first wireless communication device may communicate the first and second feedback using the same beam.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device, a downlink control information (DCI) message that schedules a first communication signal and includes a second grant for transmitting a first feedback associated with the first communication signal;
communicating, by the first wireless communication device with the second wireless communication device, a first grant for transmitting the first feedback associated with the first communication signal, the second grant being communicated before the first grant for transmitting the first feedback; and communicating, by the first wireless communication device with the second wireless communication device, the first feedback based on the first grant.

2. The method of claim 1, wherein the first communication signal is communicated via a physical downlink (DL) shared channel (PDSCH).

3. The method of claim 1, further comprising:
performing, by the first wireless communication device, a listen-before-talk (LBT) in an unlicensed spectrum for communicating the first feedback based on the second grant, wherein the LBT results in a LBT fail.

4. The method of claim 3, wherein performing the LBT includes performing the LBT for communicating the first feedback using a first beam, and wherein communicating the first feedback based on the first grant includes communicating the first feedback using the first beam or using a second beam different from the first beam.

5. The method of claim 1, further comprising:
communicating, by the first wireless communication device with the second wireless communication device, a second communication signal, wherein communicating the first grant further includes communicating the first grant for transmitting a second feedback associated with the second communication signal.

6. The method of claim 5, further comprising:
communicating, by the first wireless communication device with the second wireless communication device, the second feedback based on the first grant.

7. The method of claim 6, wherein communicating the first and second feedback includes communicating, during a first transmission opportunity (TXOP), the first feedback in a first slot and the second feedback in a second slot.

8. The method of claim 7, wherein the first and second slots correspond to a same slot or correspond to different slots.

9. The method of claim 7, wherein the communicating the first grant further includes:
communicating a first acknowledgement resource indicator (ARI) indicating a first resource in the first slot for the first feedback; and
communicating a second ARI indicating a second resource in the second slot for the second feedback.

10. The method of claim 6, wherein communicating the first and second feedback includes communicating the first feedback using a first beam and communicating the second feedback using a second beam different from the first beam.

11. The method of claim 6, wherein communicating the first and second feedback includes communicating the first and second feedback using a same beam.

12. The method of claim 1, wherein the first grant includes a request for a payload size of the first feedback and further includes a request for a bitmask of one or more DL grants associated with the first feedback.

13. An apparatus comprising:
a transceiver configured to:
communicate, with a second wireless communication device, a downlink control information (DCI) message that schedules a first communication signal and includes a second grant for transmitting a first feedback associated with the first communication signal;
communicate, with the second wireless communication device, a first grant for transmitting the first feedback associated with the first communication signal, the second grant being communicated before the first grant for transmitting the first feedback; and
communicate, with the second wireless communication device, the first feedback based on the first grant.

14. The apparatus of claim 13, wherein the first feedback includes an acknowledgement (ACK) indicating reception of the first communication signal without error or includes a negative-acknowledgement (NACK) indicating reception of the first communication signal with error.

15. The apparatus of claim 13, wherein the first communication signal is communicated via a physical downlink shared channel (PDSCH).

16. The apparatus of claim 13, further comprising:
a processor configured to perform a listen-before-talk (LBT) in an unlicensed spectrum for communicating the first feedback based on a second grant, wherein the LBT results in a LBT fail.

17. The apparatus of claim 16, wherein the processor is configured to perform the LBT for communicating the first feedback using a first beam, and the transceiver is configured to communicate the first feedback based on the first grant using a second beam different from the first beam.

18. The apparatus of claim 16, wherein processor is configured to perform the LBT for communicating the first feedback using a first beam, and the transceiver is configured to communicate the first feedback based on the first grant using the first beam.

19. The apparatus of claim 13, wherein the first grant includes at least one of a request for a payload size of the first feedback or a request for a bitmask of one or more DL grants associated with the first feedback.

20. The apparatus of claim 13, wherein the transceiver is configured to:
communicate, with the second wireless communication device, a second communication signal; and
communicate, with the second wireless communication device, a second feedback based on the first grant, wherein the transceiver communicates the first grant for transmitting the second feedback associated with the second communication signal.

21. The apparatus of claim 20, wherein the transceiver is configured to communicate, during a first TXOP, the first feedback in a first slot and the second feedback in a second slot.

22. The apparatus of claim 21, wherein the first and second slots correspond to a same slot or correspond to different slots.

23. The apparatus of claim 20, wherein the transceiver is configured to communicate the first feedback using a first beam and communicate the second feedback using a second beam different from the first beam.

24. The apparatus of claim 20, wherein the transceiver is configured to communicate the first and second feedback using a same beam.

25. A non-transitory computer-readable medium having program code recorded thereon, the program code comprising:
code for causing a first wireless communication device to communicate, with a second wireless communication device, a downlink control information (DCI) message that schedules a first communication signal and includes a second grant for transmitting a first feedback associated with the first communication signal;
code for causing the first wireless communication device to communicate, with the second wireless communication device, a first grant for transmitting the first feedback associated with the first communication signal, the second grant being communicated before the first grant for transmitting the first feedback; and code for causing the first wireless communication device to communicate, with the second wireless communication device, the first feedback based on the first grant.

26. The non-transitory computer-readable medium of claim 25, the program code comprising:
   code for causing the first wireless communication device to perform a listen-before-talk (LBT) for communicating the first feedback using a first beam, wherein the code for causing the first wireless communication device to communicate the first feedback based on the first grant includes code for causing the first wireless communication device to communicate the first feedback using the first beam or using a second beam different from the first beam.

27. The non-transitory computer-readable medium of claim 25, wherein the code for causing the first wireless communication device to communicate the first grant further includes:
   code for causing the first wireless communication device to communicate a first acknowledgement resource indicator (ARI) indicating a first resource in a first slot for the first feedback; and
   code for causing the first wireless communication device to communicate a second ARI indicating a second resource in a second slot for a second feedback associated with a second communication signal.

28. The non-transitory computer-readable medium of claim 25, the program code comprising:
   code for causing the first wireless communication device to communicate, with the second wireless communication device, a second communication signal, wherein the code for causing the first wireless communication device to communicate the first grant further includes code for causing the first wireless communication device to communicate the first grant for transmitting a second feedback associated with the second communication signal; and
   code for causing the first wireless communication device to communicate, with the second wireless communication device, the second feedback based on the first grant, wherein the code for causing the first wireless communication device to communicate the first feedback and the second feedback includes code for causing the first wireless communication device to communicate the first feedback and the second feedback using a same beam or different beams.

* * * * *